Figure 1:
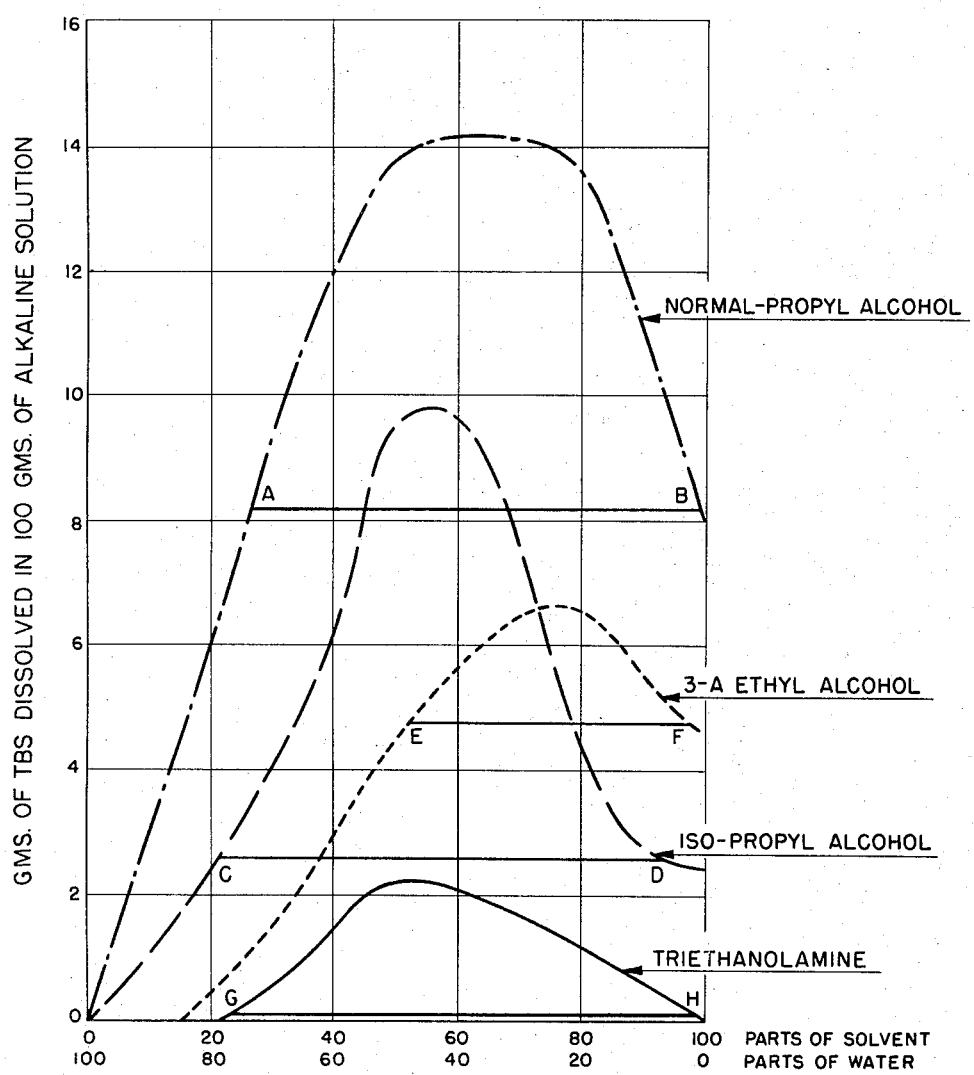

United States Patent Office 3,359,157
Patented Dec. 19, 1967

3,359,157
ANTIMICROBIAL SOLUTION CONTAINING SODIUM OR POTASSIUM SALT OF 3,4′,5-TRIBROMO-SALICYLANILIDE, ALCOHOL AND WATER
William A. Kelly, Teaneck, N.J., assignor to Lever Brothers Company, New York, N.Y., a corporation of Maine
Filed Apr. 14, 1964, Ser. No. 359,705
20 Claims. (Cl. 167—30)

This application is a continuation-in-part of U.S. application Ser. No. 54,663, filed Sept. 8, 1960, now abandoned.

The present invention relates to novel antimicrobial solutions. In particular, it relates to salts of 3,4′,5-tribromosalicylanilide dissolved in mixtures of water and organic liquids.

The need of stringent sanitation in hospitals and sickrooms has been pointed out by the increasing frequency of troublesome infections caused by antibiotic resistant strains of staphylococci. Major sources of staphylococcal contamination are bed linens, blankets, operating room laundry and other hospital fabrics.

The most effective way to sanitize laundry during the washing cycle is to treat it with a germicide which remains on the washed fabric. Thus, the antimicrobial agent not only enhances the germ killing action that occurs during the hot stage of the wash cycle, but more importantly, by remaining on the washed fabric, it serves to curb the development of odor, disease, and mildew-producing organisms during subsequent use.

The antimicrobial activity of 3,4′,5-tribromosalicylanilide has previously been known. In actual practice, however, attempts to apply the antimicrobial activity of 3,4′,5-tribromosalicylanilide to this sanitation problem have met with great difficulty, because the material is very insoluble in water. In addition, it is only slightly soluble in various common organic solvents, and when water is added to such as solution the compound precipitates.

The sodium and potassium salts of 3,4′,5-tribromosalicylanilide are also substantially insoluble in water and have only limited solubility in common organic solvents.

It has now been discovered in accordance with the present invention that a synergistic increase in solubility occurs when the sodium or potassium salt of 3,4′,5-tribromosalicylanilide is added to particular mixtures of water with one or more of certain selected organic solvents namely, short chain alcohols or hydroxyl alkyl amines. That is to say, more of the salt of the antimicrobial compound may be dissolved in the water-organic solvent mixture than the sum of those quantities which may be dissolved in water alone and in the organic solvent alone when the same total amount of solvent system is used in each case. This enhancement in solubility was unpredictable from physico-chemical considerations, particularly in view of the substantial insolubility of these salts in water.

Such synergistic solutions may be prepared by adding 3,4′,5-tribromosalicylanilide to a mixture of water and the organic solvent and then adding sodium hydroxide or potassium hydroxide (or adding 3,4′,5-tribromosalicylanilide (to an alkaline mixture of water and the organic solvent) so as to form the alkali metal salt of the antimicrobial compound in situ. On the other hand, such synergistic solutions may also be prepared by adding the preformed alkali metal salt of the antimicrobial compound to the mixture of water and organic solvent. In the latter case an enhancement of the synergistic effect is obtained by raising the pH to about 12.8.

This synergistic effect on solubility has been observed with such compounds as methanol, ethanol, n-propanol, i-propanol and triethanolamine.

The material commonly identified in commerce by the name 3,4′,5-tribromosalicylanilide generally also comprises some dibrominated and tetrabrominated materials.

In experiments conducted with commercially available tribromosalicylanilide, it has been found that the maximum solubility of the sodium salt occurs with a mixture of approximately 65% n-propanol, and 35% water. In the case of i-propanol, maximum solubility of the sodium salt occurs when the mixture is about 55% i-propanol and about 45% water. With ethanol, maximum solubility occurs with mixtures of about 75% ethanol and 25% water, while in the case of triethanolamine, maximum solubility occurs at about 50% water and 50% triethanolamine. The maximum solubility of the potassium salt in each solvent mixture occurs at approximately the same percentage composition as with the sodium salt. The potassium salt, however, is preferred because it is appreciably more soluble than the sodium salt in the synergistic solvent mixtures.

According to one embodiment of the invention, a mixture of water and suitable organic solvent is prepared and made alkaline with an alkali metal hydroxide. 3,4′,5-tribromosalicylanilide is then mixed in, and the clear solution which results is particularly suitable to be supplied to hospitals and laundries for use. The present invention makes possible the preparation of a germicidal solution having a commercially adequate concentration.

Figure 2:
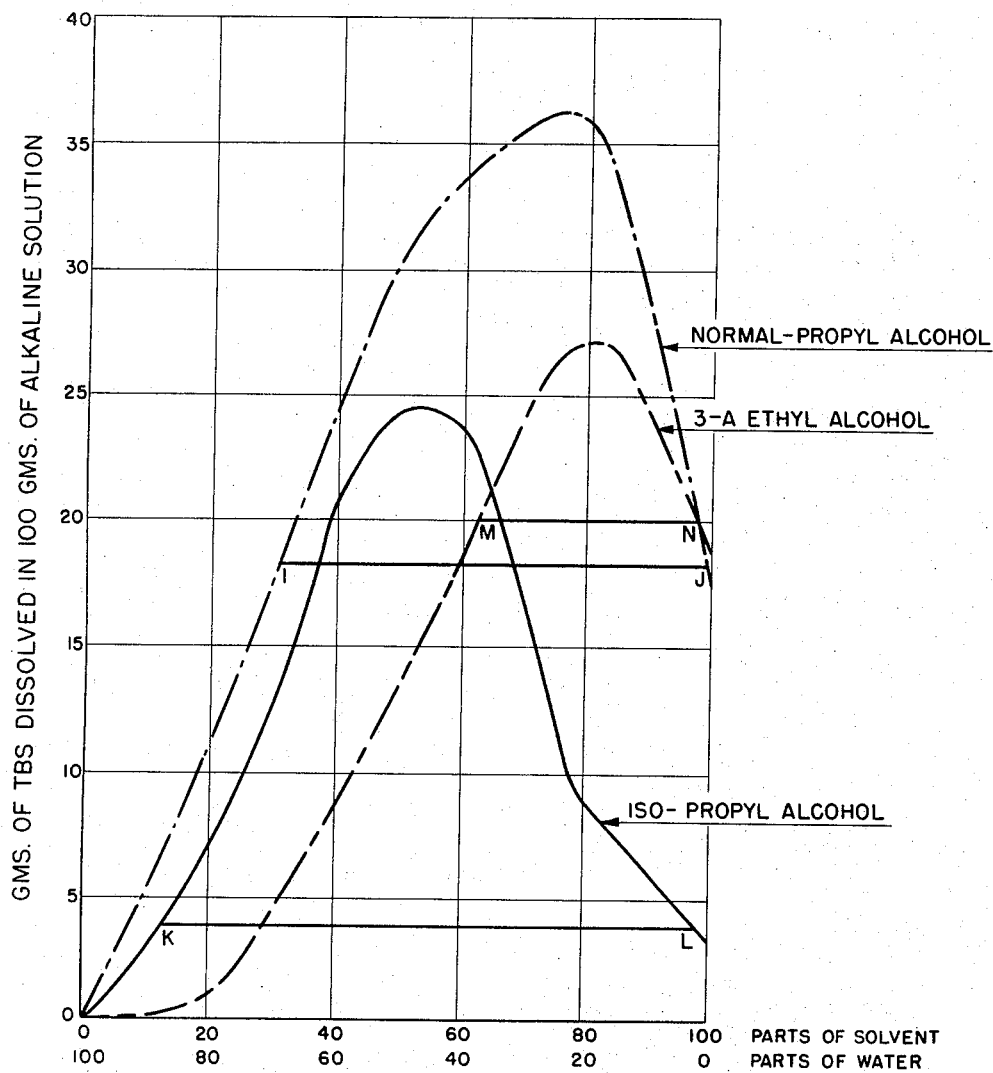

Referring to the drawing, FIG. 1 shows the grams of 3,4′,5-tribromosalicylanilide (TBS) which were dissolved in 100 grams of distilled water-solvent mixtures made alkaline (pH 12.8–12.9) with sodium hydroxide, while FIG. 2 shows the grams of 3,4′,5-tribromosalicylanilide (TBS) which were dissolved in 100 grams of distilled water-solvent mixtures made alkaline (pH 12.8–12.9) with potassium hydroxide.

The synergistic solvent systems of the invention are more completely described hereinbelow.

In regard to solutions of the sodium salt of 3,4′,5-tribromosalicylanilide, marked synergistic solubility is observed with the following solvent systems: (1) from about 73% to about 2% by weight of water and from about 27% to about 98% by weight of normal-propyl alcohol respectively, i.e., the points lying on the curve of FIG. 1 designated "normal-propyl alcohol" and above the intercept line "AB"; (2) from about 78% to about 5% by weight of water and from about 22% to about 95% by weight of iso-propyl alcohol respectively, i e., the points lying on the curve of FIG. 1 designated "iso-propyl alcohol" and above the intercept line "CD"; (3) from about 47% to about 2% by weight of water and from about 53% to about 98% by weight of ethyl alcohol respectively, i.e., the points lying on the curve of FIG. 1 designated "3-A ethyl alcohol" and above the intercept line "EF"; and (4) from about 78% to about 2% by weight of water and from about 22% to about 98% by weight of triethanolamine respectively, i.e., the points lying on the curve of FIG. 1 designated "triethanolamine" and above the intercept line "GH." Preferred solvent systems for this sodium salt having higher synergistic solubilization effect as shown by the appropriate curves in FIG. 1 are as follows: (1) from about 65% to about 10% by weight of water and from about 35% to about 90% by weight of normal-propyl alcohol respectively, (2) from about 75% to about 13% by weight of water and from about 25% to about 87% by weight of iso-propyl alcohol respectively, (3) from about 40% to about 10% by weight of water and from about 60% to about 90% by weight of ethyl alcohol respectively, and (4) from about 65% to about 10% by weight of water and from about 35% to about 90% by weight of triethanolamine respectively.

In regard to solutions of the potassium salt of 3,4′,5-tribromosalicylanilide, marked synergistic solubility is observed with the following sovent systems: (1) from about 68% to about 2% by weight of water and from about 32% to about 98% by weight of normal-propyl alcohol respectively, i.e., the points lying on the curve of FIG. 2 designated "normal-propyl alcohol" and above the intercept line "IJ"; (2) from about 88% to about 2% by weight of water and from about 12% to about 98% by weight of iso-propyl alcohol respectively, i.e., the points lying on the curve of FIG. 2 designated "iso-propyl alcohol" and above the intercept line "KL"; and (3) from about 38% to about 2% by weight of water and from about 62% to about 98% by weight of ethyl alcohol respectively, i.e., the points lying on the curve of FIG. 2 designated "3-A ethyl alcohol" and above the intercept line "MN." Preferred solvent systems for this potassium salt having higher synergistic solubilization effect as shown by the appropriate curves in FIG. 2 are as follows: (1) from about 50% to about 10% by weight of water and from about 50% to about 90% by weight of normal-propyl alcohol respectively, (2) from about 70% to about 10% by weight of water and from about 30% to about 90% by weight of iso-propyl alcohol respectively, and (3) from about 30% to about 10% by weight of water and from about 70% to about 90% by weight of ethyl alcohol respectively.

The following data set forth below in Table I through Table VII which clearly establish synergistic solubilization are representative of the plurality of data thereon indicated by the appropriate curves in FIGS. 1 and 2 of the drawing.

TABLE I (FIG. 1).—SOLUBILITY OF TBS IN ALKALINE (NaOH) MIXTURES OF NORMAL-PROPYL ALCOHOL AND WATER

| Parts of Water and Normal-propyl Alcohol in 100 grams of Alkaline Water-normal-propyl Alcohol Mixture | Grams of TBS Dissolved in 100 grams of Alkaline Water-normal-propyl Alcohol Mixture |
|---|---|
| 100 parts water | 0.01 |
| 100 parts normal-propyl alcohol | 8 |
| 73 parts water, 27 parts normal-propyl alcohol | 8.2 |
| 65 parts water, 35 parts normal-propyl alcohol | 11 |
| 35 parts water, 65 parts normal-propyl alcohol | 14 |
| 10 parts water, 90 parts normal-propyl alcohol | 11 |
| 2 parts water, 98 parts normal-propyl alcohol | 8.2 |

TABLE II (FIG. 1).—SOLUBILITY OF TBS IN ALKALINE (NaOH) MIXTURES OF ISO-PROPYL ALCOHOL AND WATER

| Parts of Water and Iso-Propyl Alcohol in 100 grams of Alkaline Water-Iso-propyl Alcohol Mixture | Grams of TBS Dissolved in 100 grams of Alkaline Water-Iso-propyl Alcohol Mixture |
|---|---|
| 100 parts water | 0.01 |
| 100 parts iso-propyl alcohol | 2.3 |
| 78 parts water, 22 parts iso-propyl alcohol | 2.4 |
| 75 parts water, 25 parts iso-propyl alcohol | 3 |
| 53 parts water, 47 parts iso-propyl alcohol | 9 |
| 13 parts water, 87 parts iso-propyl alcohol | 3 |
| 5 parts water, 95 parts iso-propyl alcohol | 2.4 |

TABLE III (FIG. 1).—SOLUBILITY OF TBS IN ALKALINE (NaOH) MIXTURES OF ETHYL ALCOHOL AND WATER

| Parts of Water and Ethyl Alcohol in 100 grams of Alkaline Water-ethyl Alcohol Mixture | Grams of TBS Dissolved in 100 grams of Alkaline Water-ethyl Alcohol Mixture |
|---|---|
| 100 parts water | 0.01 |
| 100 parts 3A ethyl alcohol | 4.5 |
| 47 parts water, 53 parts 3A ethyl alcohol | 4.8 |
| 40 parts water, 60 parts 3A ethyl alcohol | 5.8 |
| 25 parts water, 75 parts 3A ethyl alcohol | 6.7 |
| 10 parts water, 90 parts 3A ethyl alcohol | 5.5 |
| 2 parts water, 98 parts 3A ethyl alcohol | 4.8 |

3A ethyl alcohol is 95% ethyl alcohol.

TABLE IV (FIG. 1).—SOLUBILITY OF TBS IN ALKALINE (NaOH) MIXTURES OF TRIETHANOLAMINE AND WATER

| Parts of Water and Triethanolamine in 100 grams of Alkaline Water-triethanolamine Mixture | Grams of TBS Dissolved in 100 grams of Alkaline Water-triethanolamine Mixture |
|---|---|
| 100 parts water | 0.01 |
| 100 parts triethanolamine | 0.01 |
| 78 parts water, 22 parts triethanolamine | 0.2 |
| 65 parts water, 35 parts triethanolamine | 1 |
| 55 parts water, 45 parts triethanolamine | 2 |
| 10 parts water, 90 parts triethanolamine | 0.7 |
| 2 parts water, 98 parts triethanolamine | 0.2 |

TABLE V (FIG. 2).—SOLUBILITY OF TBS IN ALKALINE (KOH) MIXTURES OF NORMAL-PROPYL ALCOHOL AND WATER

| Parts of Water and Normal-propyl Alcohol in 100 grams of Alkaline Water-normal-propyl Alcohol Mixture | Grams of TBS Dissolved in 100 grams of Alkaline Water-Normal-propyl Alcohol Mixture |
|---|---|
| 100 parts water | 0.03 |
| 100 parts normal-propyl alcohol | 17 |
| 68 parts water, 32 parts normal-propyl alcohol | 18 |
| 50 parts water, 50 parts normal-propyl alcohol | 30 |
| 28 parts water, 72 parts normal-propyl alcohol | 36 |
| 10 parts water, 90 parts normal-propyl alcohol | 28 |
| 2 parts water, 98 parts normal-propyl alcohol | 18 |

TABLE VI (FIG. 2).—SOLUBILITY OF TBS IN ALKALINE (KOH) MIXTURES OF ISO-PROPYL ALCOHOL AND WATER

| Parts of Water and Iso-Propyl Alcohol in 100 grams of Alkaline Water-iso-propyl Alcohol Mixture | Grams of TBS Dissolved in 100 grams of Alkaline Water-Iso-propyl Alcohol Mixture |
|---|---|
| 100 parts water | 0.03 |
| 100 parts iso-propyl alcohol | 3 |
| 88 parts water, 12 parts iso-propyl alcohol | 4 |
| 70 parts water, 30 parts iso-propyl alcohol | 13 |
| 45 parts water, 55 parts iso-propyl alcohol | 24 |
| 10 parts water, 90 parts iso-propyl alcohol | 6 |
| 2 parts water, 98 parts iso-propyl alcohol | 4 |

TABLE VII (FIG. 2).—SOLUBILITY OF TBS IN ALKALINE (KOH) MIXTURES OF ETHYL ALCOHOL AND WATER

| Parts of Water and Ethyl Alcohol in 100 grams of Alkaline Water-ethyl Alcohol Mixture | Grams of TBS Dissolved in 100 grams of Alkaline Water-ethyl Alcohol Mixture |
|---|---|
| 100 parts water | 0.03 |
| 100 parts 3A ethyl alcohol | 19 |
| 38 parts water, 62 parts 3A ethyl alcohol | 20 |
| 30 parts water, 70 parts 3A ethyl alcohol | 24 |
| 20 parts water, 80 parts 3A ethyl alcohol | 27 |
| 10 parts water, 90 parts 3A ethyl alcohol | 24 |
| 2 parts water, 98 parts 3A ethyl alcohol | 20 |

3A ethyl alcohol is 95% ethyl alcohol.

The method for measuring the solubility shown by the curves in FIGS. 1 and 2 and by the data in Tables I–VII was as follows: a measured excess of the potassium or sodium salt of 3,4′,5-tribromosalicylanilide and 15 ml. of the alkali solvent system being tested were sealed in a Pyrex glass tube 12 cm. long and 1.6 cm. in diameter. The sealed tubes were turned end over end in a water bath maintained at 25.6° C. for 24 hours. The saturated solutions were then centrifuged for a few minutes and the clear supernatant liquids were drawn off. Solubility was calculated by the difference in weight between the originally present salt and the dried undissolved salt remaining.

The potassium and sodium salts were prepared in the following manner: an equivalent quantity of alcoholic potassium hydroxide or sodium hydroxide was added slowly with agitation to a mixture containing 20 grams of pure 3,4′,5-tribromosalicylanilide, having a melting point of 227–228° C., suspended in 350 ml. of 3A alcohol. After the addition of the potassium or sodium hydroxide, the solution was clear except for a few small residual crystals. The clear solution was transferred to a large crystallizing dish and placed in a vacuum desiccator in order to remove the solvent and to crystallize the salt. After having been dried over anhydrous calcium chloride, the potassium salt melted at 316° C. with decomposition.

The following example illustrates a preferred method of carrying out the present invention.

EXAMPLE

A preferred example of the present invention is formulated by mixing i-propanol and water and adding potassium hydroxide to the mixture. 3,4′,5-tribromosalicylanilide is then added. The quantities employed are in the following proportions:

| | Percent |
|---|---|
| 3,4′,5-tribromosalicylanilide | 3.11 |
| Potassium hydroxide | 0.60 |
| Isopropanol | 30.00 |
| Water | 66.29 |

A clear amber solution results.

Under ordinary washing conditions, to give bacteriostatic activity to treated fabrics, from about 4½ to 8 fluid ounces of the above composition are used per 100 pounds of dry load in the case of cottons. For blankets, from about 20 to 36 fluid ounces of the composition should be used per 100 pounds dry load.

A preferred procedure for washing is as follows: The usual sour is added to freshly drawn rinse water and agitated for 2 minutes. The required amount of the germicidal composition is diluted in 1 gallon of water and the diluted material is added gradually to the rinse water so as to achieve uniformity throughout the mass. In washing formulas where no final rinse is employed, the fabric can be satisfactorily treated in the soap or detergent solution. The composition has also been found to be compatible with laundry supplies such as softeners, bleaches, bluing, sours and starches. A particular advantage of the composition is that it is non-irritating and substantive to fabric. The most efficient application is in the final rinse water of the laundry cycle.

What is claimed is:

1. A composition of matter useful as an antimicrobial agent in laundering which is a solution of an alkali metal salt of 3,4′,5-tribromosalicylanilide solute dissolved in a synergistic aqueous binary solvent system, said solution being selected from the group consisting of (1) a solution of the sodium salt of 3,4′,5-tribromosalicylanilide solute dissolved in a synergistic binary aqueous solvent mixture selected from the group consisting of ($a_1$) from about 73% to about 2% by weight of water and from about 27% to about 98% by weight of normal-propyl alcohol respectively, ($b_1$) from about 78% to about 5% by weight of water and from about 22% to about 95% by weight of iso-propyl alcohol respectively, ($c_1$) from about 47% to about 2% by weight of water and from about 53% to about 98% by weight of ethyl alcohol respectively, and ($d_1$) from about 78% to about 2% by weight of water and from about 22% to about 98% by weight of tri-ethanolamine respectively, and (2) a solution of the potassium salt of 3,4′,5-tribromosalicylanilide solute dissolved in a synergistic binary aqueous solvent mixture selected from the group consisting of ($a_2$) from about 68% to about 2% by weight of water and from about 32% to about 98% by weight of normal-propyl alcohol respectively, ($b_2$) from about 88% to about 2% by weight of water and from about 12% to about 98% by weight of iso-propyl alcohol respectively, and ($c_2$) from about 38% to about 2% by weight of water and from about 62% to about 98% by weight of ethyl alcohol respectively.

2. A composition of matter useful as an antimicrobial agent in laundering which is a solution of the potassium salt of 3,4′,5-tribromosalicylanilide solute dissolved in a synergistic binary aqueous solvent mixture of from about 68% to about 2% by weight of water and from about 32% to about 98% by weight of normal-propyl alcohol respectively.

3. A composition of matter useful as an antimicrobial agent in laundering which is a solution of the potassium salt of 3,4′,5-tribromosalicylanilide solute dissolved in a synergistic binary aqueous solvent mixture of from about 50% to about 10% by weight of water and from about 50% to about 90% by weight of normal-propyl alcohol respectively.

4. A composition of matter useful as an antimicrobial agent in laundering which is a solution of the potassium salt of 3,4′,5-tribromosalicylanilide solute dissolved in a synergistic binary aqueous solvent mixture of from about 88% to about 2% by weight of water and from about 12% to about 98% by weight of iso-propyl alcohol respectively.

5. A composition of matter useful as an antimicrobial agent in laundering which is a solution of the potassium salt of 3,4′,5-tribromosalicylanilide solute dissolved in a synergistic binary aqueous solvent mixture of from about 70% to about 10% by weight of water and from about 30% to about 90% by weight of iso-propyl alcohol respectively.

6. A composition of matter useful as an antimicrobial agent in laundering which is a solution of the potassium salt of 3,4′,5-tribromosalicylanilide solute dissolved in a synergistic binary aqueous solvent mixture of from about 38% to about 2% by weight of water and from about 62% to about 98% by weight of ethyl alcohol respectively.

7. A composition of matter useful as an antimicrobial agent in laundering which is a solution of the potassium salt of 3,4′,5-tribromosalicylanilide solute dissolved in a synergistic binary aqueous solvent mixture of from about 30% to about 10% by weight of water and from about 70% to about 90% by weight of ethyl alcohol respectively.

8. A composition of matter useful as an antimicrobial agent in laundering which is a solution of the sodium salt of 3,4′,5-tribromosalicylanilide solute dissolved in a synergistic binary aqueous solvent mixture of from about 73% to about 2% by weight of water and from about 27% to about 98% by weight of normal-propyl alcohol respectively.

9. A composition of matter useful as an antimicrobial agent in laundering which is a solution of the sodium salt of 3,4′,5-tribromosalicylanilide solute dissolved in a synergistic binary aqueous solvent mixture of from about 65% to about 10% by weight of water and from about 35% to about 90% by weight of normal-propyl alcohol respectively.

10. A composition of matter useful as an antimicrobial agent in laundering which is a solution of the sodium salt of 3,4′,5-tribromosalicylanilide solute dissolved in a synergistic binary aqueous solvent mixture of from about 78% to about 5% by weight of water and from about 22% to about 95% by weight of iso-propyl alcohol respectively.

11. A composition of matter useful as an antimicrobial agent in laundering which is a solution of the sodium salt of 3,4′,5-tribromosalicylanilide solute dissolved in a synergistic binary aqueous solvent mixture of from about 75% to about 13% by weight of water and from about 25% to about 87% by weight of iso-propyl alcohol respectively.

12. A composition of matter useful as an antimicrobial agent in laundering which is a solution of the sodium salt of 3,4′,5-tribromosalicylanilide solute dissolved in a synergistic binary aqueous solvent mixture of from about 47% to about 2% by weight of water and from about 53% to about 98% by weight of ethyl alcohol respectively.

13. A composition of matter useful as an antimicrobial agent in laundering which is a solution of the sodium salt of 3,4',5-tribromosalicylanilide solute dissolved in a synergistic binary aqueous solvent mixture of from about 40% to about 10% by weight of water and from about 60% to about 90% by weight of ethyl alcohol respectively.

14. A composition of matter useful as an antimicrobial agent in laundering which is a solution of the sodium salt of 3,4',5-tribromosalicylanilide solute dissolved in a synergistic binary aqueous solvent mixture of from about 78% to about 2% by weight of water and from about 22% to about 98% by weight of triethanolamine respectively.

15. A composition of matter useful as an antimicrobial agent in laundering which is a solution of the sodium salt of 3,4',5-tribromosalicylanilide solute dissolved in a synergistic binary aqueous solvent mixture of from about 65% to about 10% by weight of water and from about 35% to about 90% by weight of triethanolamine respectively.

16. A composition of matter useful as an antimicrobial agent in laundering which is a solution of the sodium salt of 3,4',5-tribromosalicylanilide solute dissolved in a synergistic binary aqueous solvent mixture of about 35% by weight of water and about 65% by weight of normal-propyl alcohol.

17. A composition of matter useful as an antimicrobial agent in laundering which is a solution of the sodium salt of 3,4',5-tribromosalicylanilide solute dissolved in a synergistic binary aqueous solvent mixture of about 53% by weight of water and about 47% by weight of iso-propyl alcohol.

18. A composition of matter useful as an antimicrobial agent in laundering which is a solution of the sodium salt of 3,4',5-tribromosalicylanilide solute dissolved in a synergistic binary aqueous solvent mixture of about 25% by weight of water and about 75% by weight of ethyl alcohol.

19. A composition of matter useful as an antimicrobial agent in laundering which is a solution of the potassium salt of 3,4',5-tribromosalicylanilide solute dissolved in a synergistic binary aqueous solvent mixture of from about 70% to about 45% by weight of water and from about 30% to about 55% by weight of iso-propyl alcohol respectively.

20. A composition of matter useful as an antimicrobial agent in laundering which is a solution of the potassium salt of 3,4',5-tribromosalicylanilide solute dissolved in a synergistic binary aqueous solvent mixture of about 20% by weight of water and about 80% by weight of ethyl alcohol.

References Cited

UNITED STATES PATENTS

| | | | |
|---|---|---|---|
| 121,044 | 11/1871 | Dotch | 167—31 |
| 996,759 | 7/1911 | Haertel | 167—31 |
| 1,992,577 | 2/1935 | Moness | 167—31 |
| 2,014,720 | 9/1935 | Christiansen | 167—31 |
| 2,079,772 | 5/1937 | Schuler | 167—31 |
| 2,191,405 | 2/1940 | Hueter | 167—31 |
| 2,326,933 | 8/1943 | Endres | 167—31 |
| 2,861,916 | 11/1958 | Model | 167—31 |
| 2,967,885 | 1/1961 | Lamberte | 167—31 |

ALBERT T. MEYERS, *Primary Examiner.*

J. D. GOLDBERG, *Assistant Examiner.*